(12) United States Patent
Bailie et al.

(10) Patent No.: US 8,903,602 B2
(45) Date of Patent: Dec. 2, 2014

(54) TIRE PRESSURE MONITORING SYSTEM WHEEL ROTATION AUTO LOCATION

(75) Inventors: Ivan Andrew David Bailie, Antrim (IE); John Greer, Randalstown (IE); Philip Craig, Antrim (IE); Peter Mackel, Louth (IE); Samuel Strahan, Antrim (IE)

(73) Assignee: Schrader Electronics, Ltd., Antrim (GB)

( * ) Notice: Subject to any disclaimer, the term of this patent is extended or adjusted under 35 U.S.C. 154(b) by 268 days.

(21) Appl. No.: 13/192,237

(22) Filed: Jul. 27, 2011

(65) Prior Publication Data

US 2012/0029767 A1    Feb. 2, 2012

Related U.S. Application Data

(60) Provisional application No. 61/400,622, filed on Jul. 30, 2010.

(51) Int. Cl.
*G06F 7/00* (2006.01)
*B60C 23/04* (2006.01)

(52) U.S. Cl.
CPC ......... *B60C 23/0416* (2013.01); *B60C 23/0488* (2013.01)

USPC .......................................................... 701/36

(58) Field of Classification Search
USPC .................. 701/36, 124, 29.1, 31.5
See application file for complete search history.

(56) References Cited

U.S. PATENT DOCUMENTS

2009/0224900 A1* 9/2009 Shimura ...................... 340/447
2011/0288720 A1* 11/2011 Huchard et al. ................ 701/29

* cited by examiner

*Primary Examiner* — Kim T Nguyen
(74) *Attorney, Agent, or Firm* — Holland & Hart LLP

(57) ABSTRACT

A TPM system wheel unit measures rotational period over a number of wheel revolutions, calculates a value of a period of the revolutions and wirelessly transmits the calculated value of the period to a tire pressure monitoring system receiver in the vehicle mounting the wheel. Alternatively, each wheel unit transmits an RF burst of a predetermined length and a received RF burst envelope modulated with a periodic modulation pattern is used to calculate the period of one wheel rotation for each wheel. A central vehicle electronic control unit monitors wheel speed signals for each wheel of the vehicle and calculates a period for the wheel speed signal for each wheel of the vehicle, bounded by a rolling window which may be of variable length. The calculated values are compared and the wheel unit and the wheel location are correlated therefrom.

21 Claims, 3 Drawing Sheets

TIRE PRESSURE MONITORING SYSTEM WHEEL ROTATION AUTO LOCATION

BACKGROUND OF THE INVENTION

1. Field of the Invention

This invention relates generally to Tire Pressure Monitoring (TPM) systems, and specifically to autolocation of wheel units in a TPM system.

2. Description of the Prior Art

The tire pressure of motor vehicles should be kept within specified limits for both safety and efficiency reasons. TPM systems remotely monitor tire pressure and alert the vehicle user when a specified pressure threshold has been crossed. Hence the user is constantly aware of the condition of their vehicle tire pressures. The TPM systems typically include wheel units, one located in each wheel, which encode and broadcast pressure, temperature and a unique identifier via a wireless transmitter circuit, and a Radio Frequency (RF) receiver located on the vehicle which receives and decodes the pressure, temperature, and unique identifier information. The wheel unit sends messages to the central receiver concerning tire condition, such as tire pressure, and oftentimes tire temperature, and the user is alerted to the existence of the warning. Due to the unique identifier for each wheel unit, the user can be alerted to the location of the tire in which the error condition exists, hence improving diagnosis and repair of the error. It is common that during the lifetime of a tire it will be moved from one location to another on a vehicle e.g. when tires are rotated.

SUMMARY

The present invention is directed to systems and methods which determine the location of tire pressure wheel units by correlating information from the wheel units and other sensors on the vehicle, such as rotation sensors used by the vehicle Antilock Brake System (ABS) or other such systems. It is advantageous that the TPM system will automatically update the location of the tire pressure wheel units following an event such as tire rotation.

In accordance with various embodiments, a method for TPM auto-location using correlation of wheel rotational speed and/or wheel rotational period includes a tire pressure monitoring system wheel unit measuring rotational period over a number of revolutions of a wheel mounting the wheel unit. This measuring may occur over a timing window. The wheel unit then calculates a value of a period for the number of revolutions and may employ a phase-locked loop which uses averaging techniques. The wheel unit wirelessly transmits the calculated value of the period for the number of revolutions to a tire pressure monitoring system receiver in the vehicle mounting the wheel and an identification (ID) for the wheel unit. The transmission may also include the number of revolutions used to calculate the period. Alternatively or additionally, the wheel unit may transmit information regarding position of the wheel on the left or right of the vehicle, such as may be based on wheel rotation direction. A central vehicle electronic control unit monitors antilock brake signals or similar wheel speed signals for each wheel of the vehicle, such as such as could be generated by optical or magnetic speed sensors associated with each wheel, brake rotor, or the like, and calculates a period for the antilock brake signal for each wheel of the vehicle, bounded by one or more rolling windows, which may be of variable length. This rolling window may contain the number of wheel revolutions used by the wheel unit when measuring the rotational period, but the size of the rolling window may be adjusted based on a variety of factors such as vehicle speed, road conditions, etc. The calculated value of the period for the number of revolutions transmitted by the wheel unit is compared to each of the calculated periods for the antilock brake signals. As a result, the wheel unit and the wheel location from which the period for the antilock brake signal was calculated which most closely matches the transmitted calculated value of the period for the number of revolutions are correlated in order to locate each wheel unit to a specific wheel location on the vehicle. In the case where a left/right location of a wheel unit is transmitted with rotation speed/period information this correlation may only need to locate the wheel unit to a front or rear axle of the vehicle.

Other embodiments of the method for TPM auto-location using correlation of wheel rotational speed and/or wheel rotational period include each tire pressure monitoring system wheel unit transmitting an RF burst. These RF bursts may be hundreds of milliseconds in length. Additionally, the wheel unit may transmit information regarding position of the wheel on the left or right of the vehicle, such as may be based on wheel rotation direction, and/or an ID for the wheel unit. A central vehicle electronic control unit receives the RF burst from each wheel. Each received RF burst has an envelope modulated as a function of rotation of the wheel from which it is transmitted due to environmental effects, such rotation of the wheel itself, and/or transmission path effects. The central vehicle electronic control unit calculates the period of one or more wheel rotations for each wheel using this periodic pattern. The period of one wheel rotation for each wheel is based on the number of revolutions of the wheel, which depends on the length of the RF burst and wheel rotational speed. The central vehicle electronic control unit also monitors ABS signals for each wheel location and calculates a period for each of the ABS signals, bounded by one or more rolling windows, which may be of variable length. The rolling window may contain a number of wheel revolutions, which may be adjusted based on vehicle speed. The central vehicle electronic control unit then correlates the period of one wheel rotation for each wheel to the period for each of the ABS signals to locate each wheel unit to a specific wheel location on the vehicle. In the case where a left/right location of a wheel unit is transmitted with rotation speed/period information this correlation may only need to locate the wheel unit to a front or rear axle of the vehicle.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The wheels on a vehicle will normally rotate at slightly different speeds due to vehicle loading, road condition, turning corners, tire wear etc. In accordance with various embodiments of the present auto-location using correlation of wheel rotational information, such as the rotational speed/period of each of the wheels, is gathered from two independent sources, the sources can be compared and associated with each other.

A first source that may be used to gather information regarding the rotational period of each wheel is the ABS sensors which are mounted to the vehicle. This system consists of a toothed ring and an associated sensor, which is hard-wired to each wheel location. As this is a hard-wired system, information is available to a vehicle's Body Control Module (BCM) on a per wheel basis. ABS rotation information is typically updated in the order of tens of milliseconds. In accordance with the present systems and methods, the second source used to gather information regarding the rotational speed/period of each wheel is information which is generated from the TPM wheel units.

Figure 1:
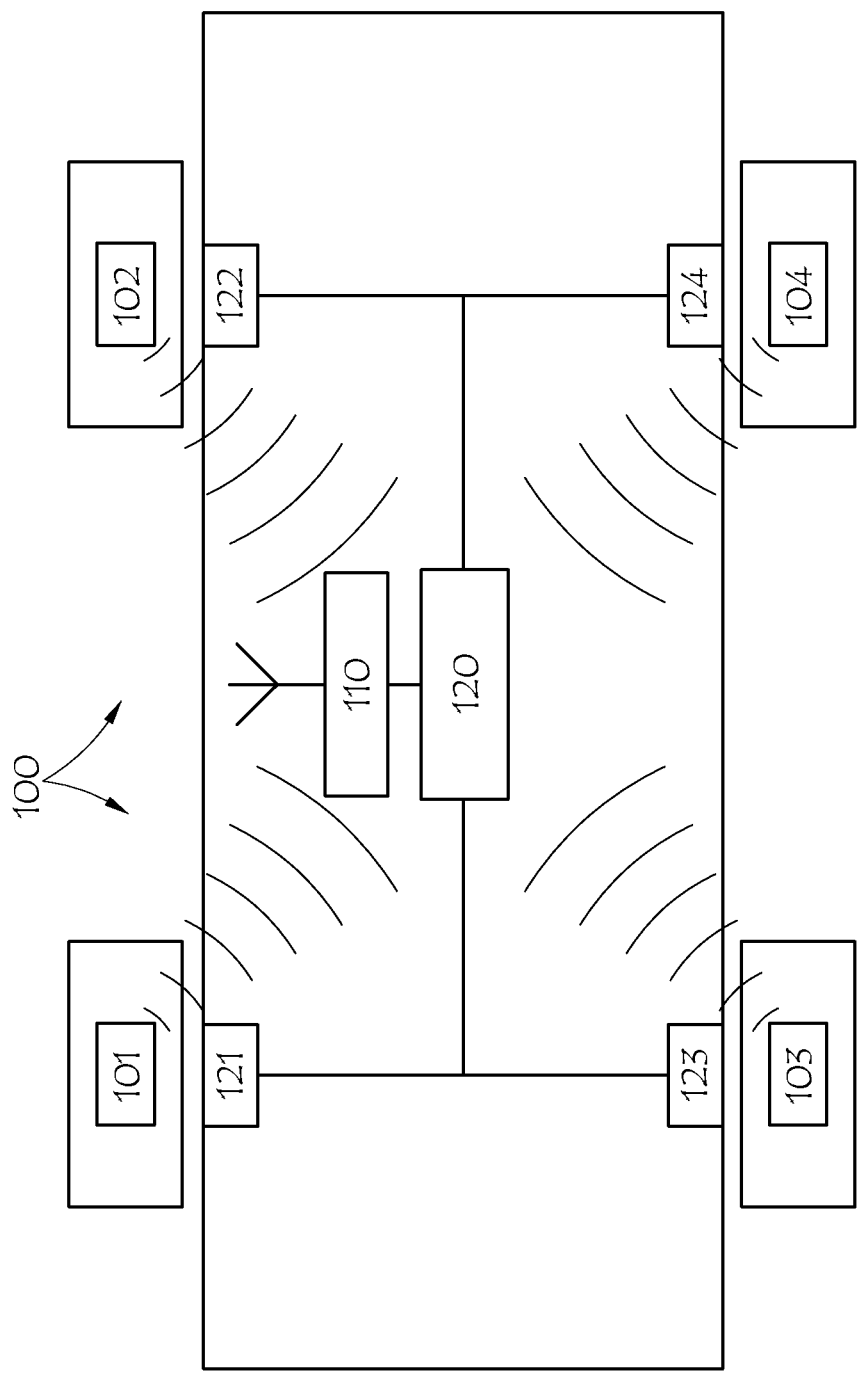
FIG. 1 is an environmental block diagram of an exemplary embodiment of a TPM system employing auto-location using correlation of wheel rotational information.

As noted, FIG. 1 is an environmental block diagram of an exemplary embodiment of TPM system employing auto-location using correlation of wheel rotational information. The components used in TPM system 100 that employs the present auto-location using correlation of wheel rotational information are shown in FIG. 1 in diagrammatic fashion. Wheel units (101, 102, 103 and 104) are located inside each wheel of the vehicle. The wheel units transmit pressure, temperature, unique identifier and additional information over a wireless link to TPM RF receiver, which may be a part of, or otherwise linked to a central vehicle Electronic Control Unit (ECU) 110. Information from the rotation speed sensors (121, 122, 123 and 124) of the ABS system is available to BCM 120 and is passed to ECU 110, such as via the Controller Area Network (CAN) bus of the vehicle.

In accordance with various embodiments of the present systems and methods for auto-location using correlation of wheel rotational information, rotational speed/period information is generated within the wheel units themselves. Using piezoelectric sensors, accelerometers, or the like, a wheel unit can sense its rotational speed/period. The rotational period information is continuously gathered from the wheel units over a number of revolutions and then the period information is encoded into a data frame. The data frame is transmitted to the RF receiver and decoded by the ECU.

Figure 2:
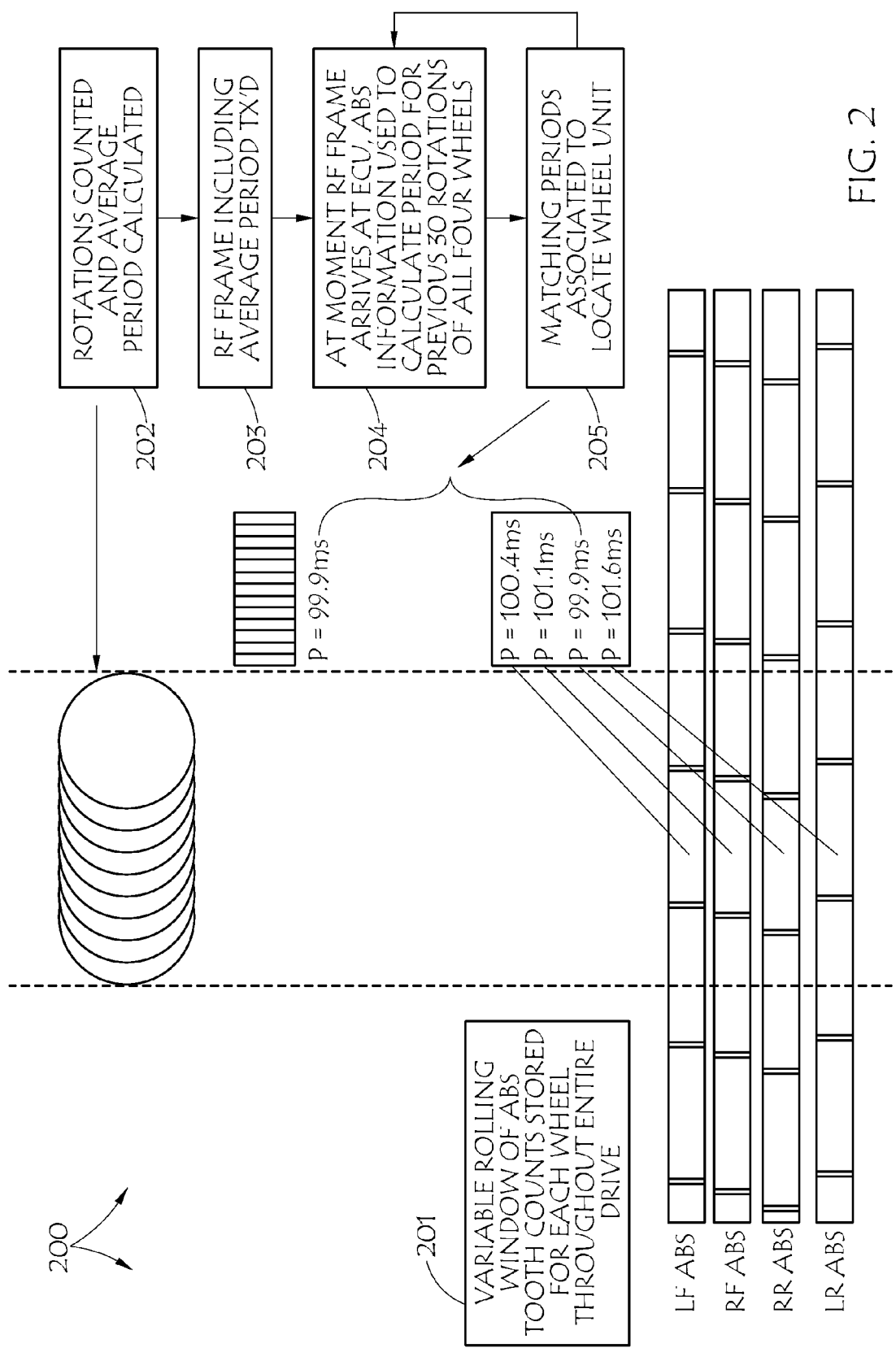
FIG. 2 is a diagrammatic illustration of an exemplary embodiment of a methods for auto-location using correlation of wheel rotational information; and, FIG. 3 is a diagrammatic illustration of another exemplary embodiment of methods for auto-location using correlation of wheel rotational information.

FIG. 2 diagrammatically illustrates exemplary embodiment 200 of such methods for auto-location using correlation of wheel rotational information. ABS information from each wheel location being transmitted at regular intervals over the CAN bus is received by the ECU at 201, whereby one or more rolling windows (which may be adjusted) are continuously updated throughout a drive and tooth count values at precise points in time, and hence wheel speed, can be calculated by interpolating the ABS information. A wheel unit measures and calculates (202) the period for one wheel rotation over a continuous sample of, for example thirty, rotations. At 203, the calculated period is encoded into an RF data frame and transmitted by the wheel unit. This transmission may include other information such as a wheel unit ID and/or the number of revolutions over which the period is calculated. The RF receiver decodes the RF transmission, including period information, to thereby supply one independent source of wheel rotation period information. At the time the RF transmission from the wheel unit arrives at the RF receiver (204), the applicable value of wheel rotation period, calculated in 201 above, is stored for all four ABS sensors/wheels. At 205, the period received from a wheel unit is compared to the four applicable period values stored from the CAN bus, and the wheel unit ID and the ABS sensor location of the periods which match most closely are associated to provide a location, based on the matched ABS signal. In the example shown in FIG. 2, since the period calculated and transmitted by the wheel unit most closely matches the ABS period calculated for the right rear (RR), the received ID for the wheel unit is associated with the right rear wheel location. As an RF transmission from each wheel unit is received steps 204 and 205 are repeated to locate each of the wheel units and/or to confirm/refine a wheel unit's location.

Figure 3:
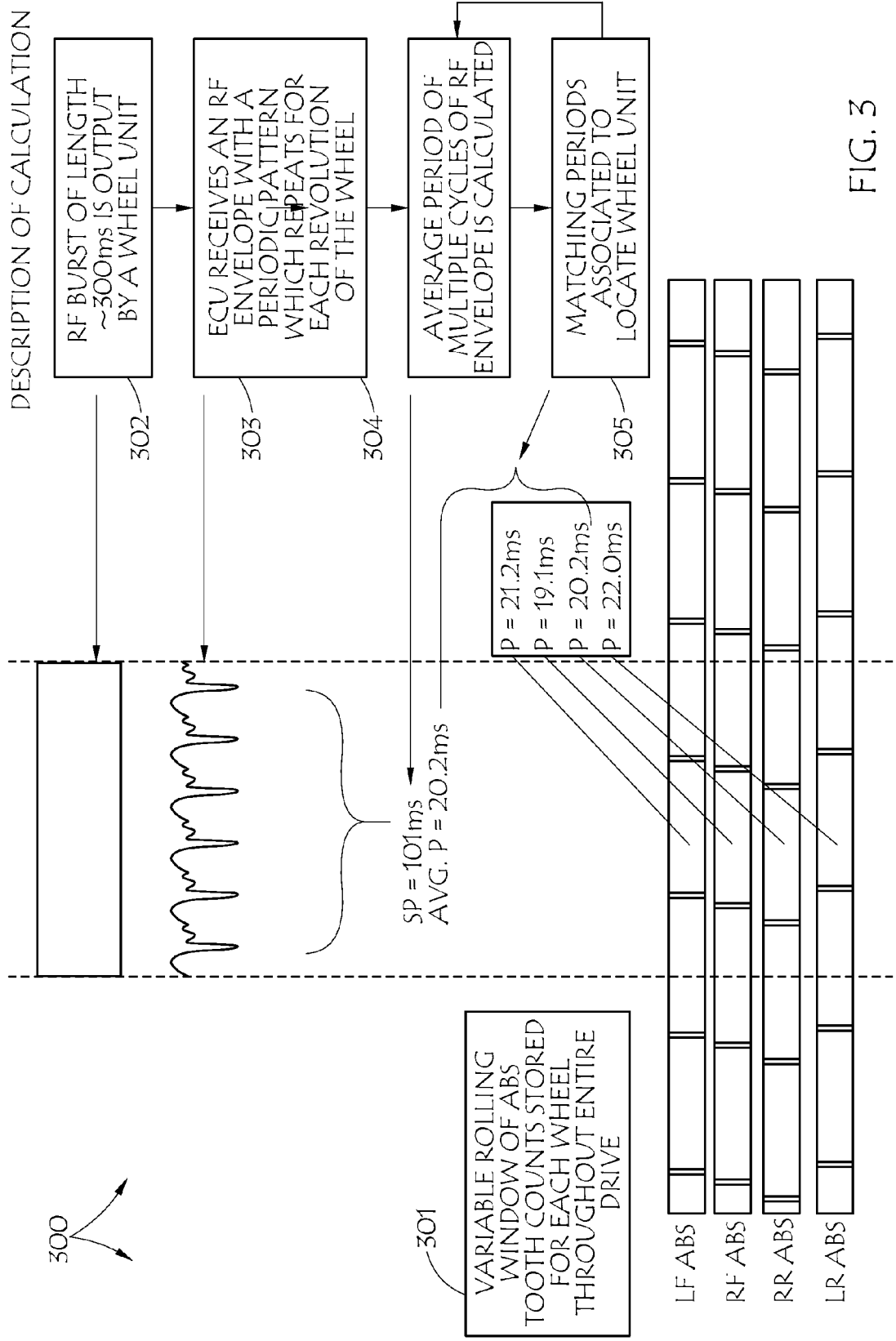

A RF burst transmitted by a wheel unit is modulated by the physical objects in the RF channel. The resulting RF signal received by the RF receiver has a periodic change in amplitude which is repeated for each rotation of the wheel. By analyzing this periodic signal, the period of a wheel revolution can be determined. FIG. 3 is a diagrammatic illustration of an exemplary embodiment of methods for auto-location using correlation of wheel rotational information which takes advantage of this modulation. Method 300 generates rotational speed/period information using both the wheel unit and the RF receiver/ECU. At 301, ABS information from each wheel location is transmitted at regular intervals over the CAN bus and received by the ECU. One or more rolling windows, which may be of variable width, are continuously updated throughout a drive. Tooth count values at precise points in time can be calculated by interpolating the ABS information. At 302, an unknown wheel unit transmits an RF burst, which may have a length on the order of hundreds of milliseconds, e.g. 300 ms. The TPM RF receiver/ECU receives the RF envelope modulated with a periodic pattern which is repeated for each revolution of the wheel at 303. At 304, the ECU calculates the period of one or more wheel rotations, using multiple modulation cycles. The rotation period derived from the wheel unit RF burst is compared to the four applicable ABS period values stored from the CAN bus, and the wheel unit ID and the ABS sensor location of the periods which match most closely are associated at 305. In the example shown in FIG. 3, since the period calculated for the wheel unit most closely matches the ABS period calculated for the right rear wheel, the received ID for the wheel unit is associated with the right rear wheel location. As an RF burst from each wheel unit is received steps 304 and 305 are repeated to locate each of the wheel units and/or to confirm/refine a wheel unit's location.

Averaging, or another statistical measure, may be applied in the above steps to the gathered information. Methods embodiments 200 and 300 above may be selectively applied to provide degrees of accuracy in various situations. For example, the rotational speed/period information from a known source, such as a vehicles ABS sensors will constantly be supplying information regarding the delta between the rotational speed/period of each wheel. From this information, the accuracy of the information from the second source, such as the TPM wheel units, can be determined, and the more accurate embodiment at a given time may be employed.

The methods described above may be augmented by correlating pairs of fastest period for the antilock brake signals with a pair of the fastest transmitted calculated value of rotational period to locate corresponding pairs of wheel units to a specific axel on the vehicle. Also, the correlations described above may be checked to ensure erroneous readings are not used. For example, a wheel speed from a wheel unit that does not generally correlate with a wheel speed obtained from the other independent source may be discarded. Further the above described methods may be employed in conjunction with, and/or to confirm, other location or autolocation mechanisms employed by a TPM system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   measuring, by a tire pressure monitoring system wheel unit, a rotational period over a number of revolutions of a wheel mounting the wheel unit;
   calculating, by the wheel unit, a value of a period for the number of revolutions;
   wirelessly transmitting, by the wheel unit, the calculated value of the period for the number of revolutions to a tire pressure monitoring system receiver in a vehicle mounting the wheel;
   monitoring, by a central vehicle electronic control unit, wheel speed signals for each wheel of the vehicle;
   calculating, by the central vehicle electronic control unit, a period for the wheel speed signal for each wheel of the vehicle, bounded by a rolling window;
   comparing the calculated value of the period for the number of revolutions transmitted by the wheel unit to each of the calculated period for the wheel speed signals; and
   correlating the wheel unit and a wheel location from which the period for the wheel speed signals was calculated which most closely matches the transmitted calculated value of the period for the number of revolutions to locate each wheel unit to a specific wheel location on the vehicle.

2. The method of claim 1, wherein said wheel speed signals are antilock brake signals.

3. The method of claim 1, wherein the rolling window is of variable length.

4. The method of claim 1 wherein said period for the wheel speed signals for each wheel of the vehicle is bounded by plurality of rolling windows.

5. The method of claim 1, wherein the rolling window contains the number of wheel revolutions over which the rotational period is measured.

6. The method of claim 1 further comprising transmitting the number of revolutions over which the rotational speed is measured.

7. The method of claim 1, wherein the calculating by the wheel unit a value of a period for the number of revolutions employs a phase-locked loop which uses averaging techniques.

8. The method of claim 1, wherein a size of the rolling window is adjusted based at least in part on vehicle speed, and/or road surface.

9. The method of claim 1, wherein the wirelessly transmitting further comprises transmitting information by the wheel unit regarding position of the wheel on the left or right side of the vehicle.

10. The method of claim 9, wherein the correlating locates the wheel unit to a front or rear axle of the vehicle.

11. The method of claim 1 wherein said correlating further comprises matching pairs of fastest period for the wheel speed signals with fastest transmitted calculated value of the period to locate corresponding pairs of wheel units to a specific axle on the vehicle.

12. A method comprising:
    transmitting an RF burst by each tire pressure monitoring system wheel unit;
    receiving, by a central vehicle electronic control unit, the RF burst from each wheel unit, each received RF burst having a modulated envelope with a periodic pattern that repeats for each revolution of the wheel from which it is transmitted;
    calculating, by the central vehicle electronic control unit, a period of one or more wheel rotations for each wheel, using the periodic pattern;
    monitoring, by the central vehicle electronic control unit, wheel speed signals for each wheel location;
    calculating, by the central vehicle electronic control unit, a period for each of the wheel speed signals, bounded by a rolling window; and
    correlating, by the central vehicle electronic control unit, the period of one wheel rotation for each wheel to the period for each of the wheel speed signals to locate each wheel unit to a specific wheel location on a vehicle.

13. The method of claim 12, wherein said wheel speed signals are antilock brake signals.

14. The method of claim 12, wherein the rolling window is of variable length.

15. The method of claim 12, wherein said period for the wheel speed signals for each wheel of the vehicle is bounded by plurality of rolling windows.

16. The method of claim 12, wherein the RF burst is generally hundreds of milliseconds in length.

17. The method of claim 12, wherein the period of one wheel rotation for each wheel is based at least in part on the number of revolutions of the wheel, which depends at least in part on a length of the RF burst and wheel rotational speed.

18. The method of claim 12, wherein a size of the rolling window is adjusted based at least in part on vehicle speed and/or road surface.

19. The method of claim 12, wherein the transmitting further comprises transmitting information by the wheel unit regarding position of the wheel on the left or right side of the vehicle.

20. The method of claim 19, wherein the comparing locates the wheel unit to a front or rear axle of the vehicle.

21. The method of claim 12, wherein the correlating further comprises correlating pairs of fastest periods of wheel rotation to fastest pairs of wheel speed signals to locate corresponding pairs of wheel units to a specific axle on the vehicle.

* * * * *